(12) United States Patent
Dierickx (10) Patent No.: US 6,237,995 B1
(45) Date of Patent: May 29, 2001

(54) CARSEAT AND STROLLER WITH FOLDING LINKAGE SYSTEM

(75) Inventor: James J. Dierickx, Iowa City, IA (US)

(73) Assignee: Stroll-N-Go Child Products, Inc., Oxford, IA (US)

(*) Notice: Subject to any disclaimer, the term of this patent is extended or adjusted under 35 U.S.C. 154(b) by 0 days.

(21) Appl. No.: 09/325,613

(22) Filed: Jun. 3, 1999

(51) Int. Cl.⁷ ....................................... A47C 13/00
(52) U.S. Cl. ................... 297/130; 297/250.1; 297/183.2; 280/648
(58) Field of Search ....................................... 297/118, 130, 297/183.1, 183.2, 183.6, 250.1; 280/30, 643, 648, 647, 650

(56) References Cited

U.S. PATENT DOCUMENTS

| | | | |
|---|---|---|---|
| 4,685,688 | * | 8/1987 | Edwards . |
| 4,872,692 | * | 10/1989 | Steenburg . |
| 4,902,026 | * | 2/1990 | Maldonado . |
| 4,989,888 | * | 2/1991 | Qureshi et al. . |
| 5,149,113 | * | 9/1992 | Alldredge . |
| 5,290,049 | * | 3/1994 | Crisp et al. . |
| 5,823,547 | * | 10/1998 | Otobe et al. . |

* cited by examiner

Primary Examiner—Milton Nelson, Jr.
(74) Attorney, Agent, or Firm—Shook, Hardy & Bacon L.L.P.

(57) ABSTRACT

A combination stroller and carseat is provided that allows the stroller to be conveniently converted into a carseat and infant carrier device. The device has a seat shell configured to hold an infant and a coupling knee rotatingly coupled to the seat shell. At least one front wheel is pivotally coupled to the knee so that the front wheel pivots relative to the seat when the knee rotates. Further, at least one rear wheel is pivotally coupled to the knee so that the rear wheel pivots relative to the seat when the knee rotates. A handle is coupled to the knee that is moveable between a first position wherein the handle is extended outwardly from the seat and a second position wherein the handle is retracted within the seat. A releasable locking mechanism is operably coupled to the handle and the knee that is operable to allow movement of the knee. As the knee rotates, the handle moves between the first and second positions and the front and rear wheels pivot relative to the seat to allow the front and rear wheels to move between a retracted position and an extended position.

5 Claims, 8 Drawing Sheets

CARSEAT AND STROLLER WITH FOLDING LINKAGE SYSTEM

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

This invention relates to infant carseats and strollers. More particularly, the invention relates to a stroller with a linkage system that allows the wheels of the stroller to retract, turning the stroller into a carseat and infant carrier device.

There are currently a number of different devices available to safely transport infants from one location to another. For example, infant carrier devices have become popular that cradle the infant and that provide a carrying handle. This carrying handle is used by the person transporting the carrying device to tote the infant about while the person is walking from one location to another. These devices are often usable as carseats for the infant. In this respect, the device is provided with structure allowing the seat belt of the vehicle to safely maintain the device in place. A separate buckle and strap assembly is provided on the device itself to maintain the infant within the device. Further, the carrying handle of these devices is provided with a mechanism which allows the handle to be moved between a first position that is out of the way when the device is used as a carseat and a second position that allows the device to be carried.

The carrying handles previously used on such devices still suffer from certain disadvantages caused by the construction and design of the handle. For example, the typical handle is merely in the shape of an inverted U. This shape requires the person carrying the device to hold the handle with the palm of his or her hand oriented perpendicularly to the direction the person is walking. Moreover, the most convenient place to hold such a handle is generally in the center of the handle. Both of these requirements make the device somewhat cumbersome to hold and carry. Further, an increased amount of strength must be used when the handle is grasped generally in the center, because the load of the weight is placed further from the person's body.

In an attempt to address some of these concerns, a carrying handle is now available that is constructed with an S-shaped top portion. This construction allows the person carrying the device to hold the handle with the palm of his or her hand oriented parallel to the direction the person is walking. Such a construction is generally easier to carry, due to the orientation of the grasping portion. However, an increased amount of strength is still needed to carry the device, because the load of the weight is placed further from the person's body due to the grasping portion being located in the center of the handle.

There are also now in existence strollers that allow an infant carrying device, as described above, to be held within a separate stroller device. This allows the carrying device to be removed from the vehicle and placed in the stroller device without removing the infant from the carrying device. This stroller/carrying device combination is disadvantageous in that it requires two separate devices; namely the carrying device/carseat and the stroller. Therefore, the stroller must be transported along with the carrying device, and separately therefrom. This can be inconvenient in that it requires extra space and requires the transportation of an additional and separate stroller.

Finally, a combination carseat/carrying device and stroller combination exists which allows the carrying device to be converted into a stroller. This construction also suffers from a number of drawbacks. First, due to the particular construction, the conversion from a carrying device to a stroller is a cumbersome process. In this construction, the wheels for the stroller must be deployed. Then, in a separate process, the handle assembly for the stroller is deployed. This two step process is awkward and time consuming. Moreover, the wheelbase of the stroller just described is not as stable as is often desired. This causes the stroller to tip when items are placed on the handle thereof, such as a diaper bag.

Of course, the other alternative transportation methods to those described above are a separate stroller, a separate carrier device and a separate carseat. This involves three different pieces of equipment that must be purchased, stored and toted about.

Therefore, an apparatus is needed that overcomes the above drawbacks and disadvantages existing in the prior art. More specifically, an apparatus is needed that combines a stroller, a carseat and an infant carrier. The apparatus must be easily convertible between the stroller and the carseat/carrier. Further, the apparatus, when in the stroller mode, needs to have a stable wheelbase. Still further, the apparatus must have a lightweight construction that allows it to be easily carried from one location to another. Further yet, the apparatus needs to have a carrying handle that makes it easier and more comfortable to carry the device.

SUMMARY OF THE INVENTION

It is therefore an objection of the present invention to provide an apparatus that may be converted from an infant carrier to a carseat to a stroller.

More particularly, it is an object of the present invention to provide an apparatus that is easily convertible between a carseat, carrying device and stroller.

It is another object of the present invention to provide an apparatus that is convertible between a carseat, carrying device and stroller that has a stable wheelbase.

It is another object of present invention to provide an apparatus that is of lightweight construction and that can be converted between a carseat/carrying device and stroller in a one-step operation.

It is also an object of present invention to provide a linkage system for an apparatus that can be converted between a carseat, carrying device and stroller.

It is yet another object of the present invention to provide a carrying handle for an infant carrying device that allows the device to be less awkwardly carried by a person.

To accomplish these and other related objects, a combination carseat and stroller is provided. The device can be conveniently converted between a stroller, a carseat and infant carrier device. The device has a seat shell configured to hold an infant and a coupling knee rotatingly coupled to the seat shell. At least one front wheel is pivotally coupled to the knee so that the front wheel pivots relative to the seat when the knee rotates. Further, at least one rear wheel is pivotally coupled to the knee so that the rear wheel pivots relative to the seat when the knee rotates. A handle is coupled to the knee that is moveable between a first position wherein the handle is extended outwardly from the seat and a second position wherein the handle is retracted within the seat. A releasable locking mechanism is operably coupled to the handle and the knee that is operable to allow movement of the knee. As the knee rotates, the handle moves between the first and second positions and the front and rear wheels pivot relative to the seat to allow the front and rear wheels to move between a retracted position and an extended position.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENT

A combination stroller, infant carrying device and carseat device is broadly designated in the drawings by the reference numeral 10. With initial reference to FIG. 1, device 10 includes a pair of front wheel assemblies 12. Each assembly 12 is a swivel-lock type device that selectively allows the wheels to swivel in one mode and locks the wheels in a straightforward orientation in an alternate mode. Each assembly 12 has a pair of spoke wheels 14 that are rotatingly coupled to either side of a front hub 16. More specifically, hub 16 has a first portion 18 to which the wheels 14 are rotatingly coupled. Each hub 16 also has a second portion 20 that is configured to receive a front kingpin 22. Kingpin 22 is allowed to rotate within hub 16 unless a locking lever 24 is depressed. If lever 24 is depressed, a mechanism engages kingpin 22 to prevent the rotation thereof. Therefore, wheels 14 and hub 16 are free to rotate about kingpin 22. This construction allows the apparatus to be easily steered when in the stroller mode. Further, the wheels 14 may be locked in a straightforward position so that they may be properly stored when the apparatus is in a carrier device or carseat mode.

Figure 1:
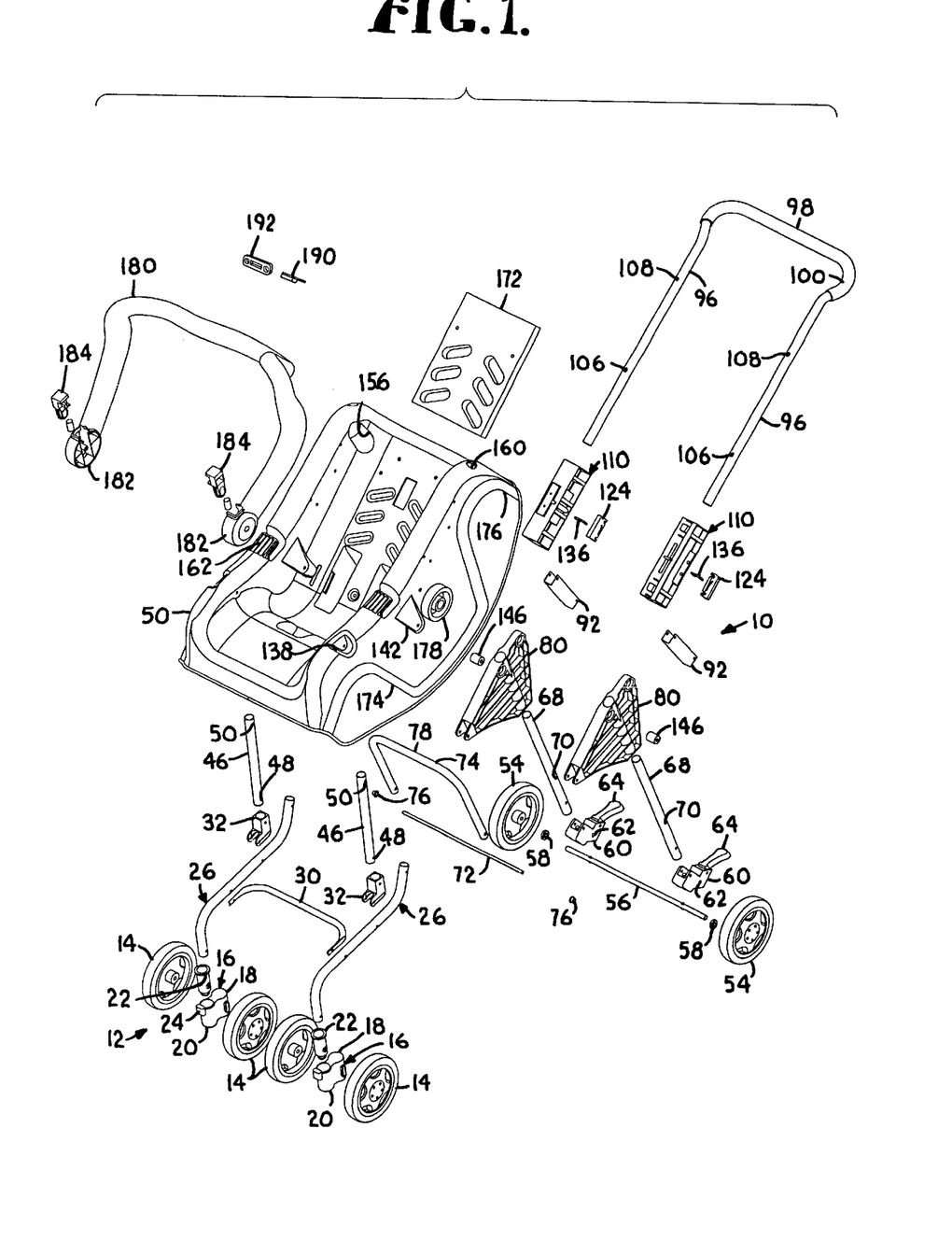
FIG. 1 is an exploded view of the apparatus of the present invention.

Each kingpin 22 has an interior cavity that receives a first end of a front main tubing piece 26. Tubing 26 is coupled to kingpin 22, such as by riveting, welding, bolting or other attaching mechanisms. Corresponding holes are provided in kingpin 22 and tubing 26 to facilitate this coupling.

As best seen in FIG. 1, each tubing piece 26 is generally s-shaped with one end of each piece 26 coupled to a corresponding wheel assembly 12, as discussed above. The pair of tubing pieces 26 is coupled together in parallel orientation with a front cross brace 30. Brace 30 is preferably made from a lightweight tubing material and is made in a shallow u-shape. Each leg of brace 30 may be arcuate in shape to conform to the outer surface of pieces 26, and to fit flush against pieces 26. Brace 30 is preferably rigidly secured to each piece 26, such as by riveting, welding or bolting.

Figure 2:
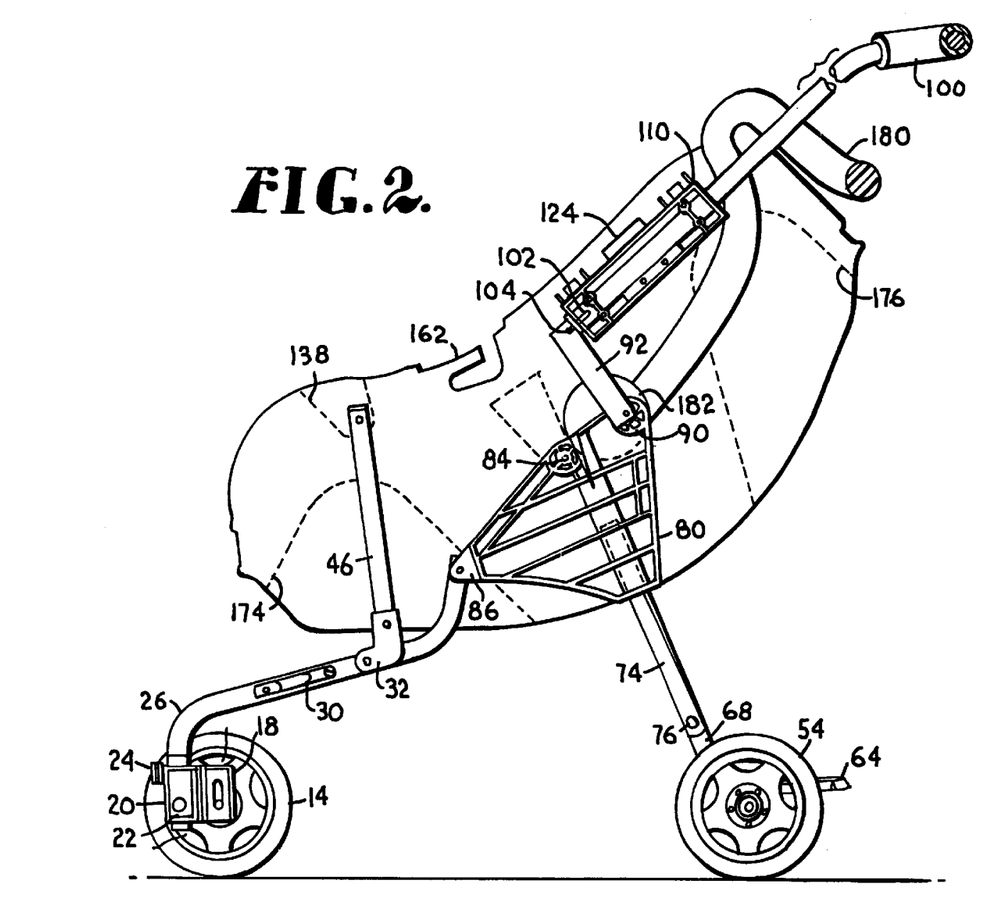
FIG. 2 is a side elevation view of the apparatus of FIG. 1, illustrating the linkage system, shown in partial cross-section.
Figure 4:
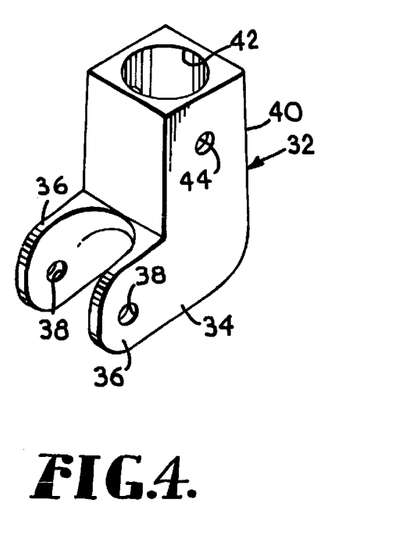
FIG. 4 is a perspective view of the saddle joint used with the apparatus in FIG. 1.

As best seen in FIG. 1, a front saddle joint 32 is pivotally coupled to each piece 26 generally above brace 30. Joint 32, as best seen in FIG. 4, has a coupling section 34 that has a pair of ears 36. Each ear 36 has a hole 38 disposed therethrough. Holes 38 are used to pivotally couple joint 32 to piece 26. More specifically, a rivet or other attaching mechanism is placed through hole 38 and a corresponding hole in piece 26. Thereafter, joint 32 can pivot about the rivet in hole 38. Joint 32 has an arcuate inner surface located rearwardly of holes 38 that is shaped to match the outer surface of piece 26. As more fully described below, this surface rests against piece 26 when the apparatus is in the stroller mode. Extending upwardly from coupling section 34 is a link section 40. Link section 40 has a square outer shape and has a hole 42 extending from the top of section 40 to the interior thereof. Link 40 also has a pair of holes 44 extending from the exterior of section 40 to the interior defined by hole 42. Holes 44 are used to rigidly couple joint 32 to a front link 46, as best seen in FIG. 2. Joint 32 is preferably made from a study and lightweight material, such as nylon.

Link 46 is preferably a piece of hollow steel tubing that has a pair of holes 48 on one end which correspond in location to holes 44 of joint 32. Link 46 is rigidly coupled to joint 32 by riveting the two components together, through holes 44 and 48. As joint 32 pivots about holes 38, link 46 will pivot as well. The end of link 46 opposite joint 32 also has a pair of holes 50. Holes 50 are used to pivotally couple link 46 to a seat 50.

As best seen in FIG. 1, device 10 is also provided with a pair of rear wheels 54. Wheels 54 are not swivel type wheels. Rather, wheels 54 are connected to one another with an axle 56. More specifically, each wheel 54 has a hub shaped to receive axle 56. A rear spacer 58 is located adjacent the hub of each wheel 54 along axle 56. Immediately adjacent spacer 58 along axle 56 is a rear brake 60. Brake 60 has a through hole 62 though which axle 56 extends. As is known to those of skill in the art, brake 60 includes a brake lever 64. Lever 64 is moveable between a first position that operates to prevent rotation of wheel 54 and a second position that allows wheel 56 to freely rotate. On the end of brake 60 opposite lever 64 is a tubing chamber into which extends a pair of connecting holes. These holes are used to rigidly couple brake 60 to a rear main tubing member 68. Member 68 has a pair of connecting holes adjacent its lower end to facilitate this connection. Brake 60 is preferably coupled to member 68 by riveting.

Member 68 extends upwardly from brake 60 and has a second pair of connecting holes 70 located above the first pair. A rear connection rod 72 couples a piece of rear support tubing 74 between the pair of members 68. More specifically, rear tubing 74 is generally in an inverted U-shape, with each of a pair of legs extending downwardly. Each of these legs has a hole disposed therethrough to accommodate rod 72. Rod 72 passes through each leg of tubing 74 and also through holes 70 in members 68. A cap 76 is placed on each end of rod 72 to hold rod 72 in place. This connection pivotally couples tubing 74 to members 68. As described more fully below, tubing 74 has a horizontal cross member 78 that is pivotally held within seat 52.

Figure 6:
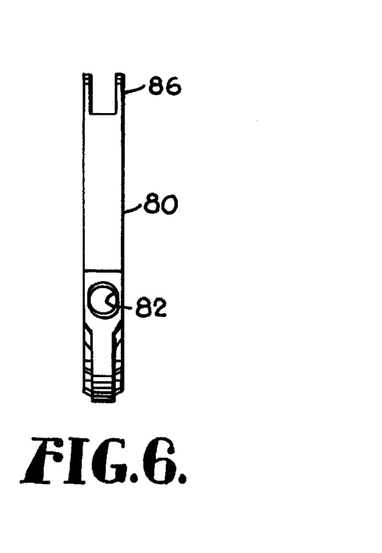
FIG. 6 is a front elevation view of the knee used with the apparatus in FIG. 1.
Figure 7:
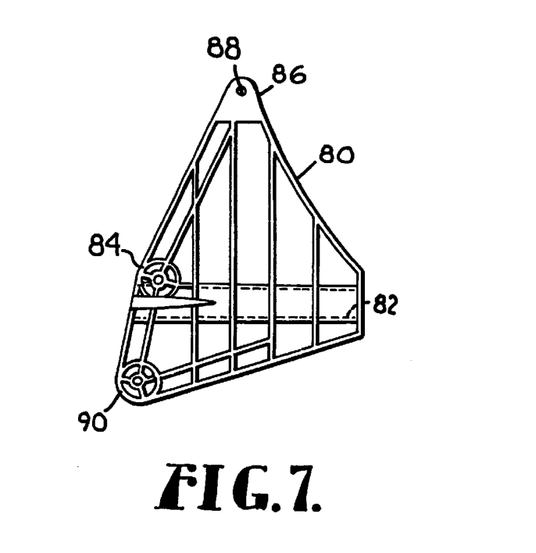
FIG. 7 is a side elevation view of the knee of FIG. 6.

The upper end of members 68 extends into a knee 80. Each knee 80, as best seen in FIGS. 6 and 7, is somewhat in the shape of a triangle and has a hole 82 extending completely therethrough. Member 68 is partially disposed withing hole 82 when device 10 is in the stroller mode and is allowed to slide therewithin. When device 10 is converted to a carseat/carrying device mode, member 68 extends completely through hole 82. Knee 80 has a pivot hub 84 located near the upper end of hole 82. Hub 84 is used to pivotally couple knee 80 to seat 52, as is more fully described below. The forward-most portion of knee 80 has a front yoke 86. Yoke 86 has a pair of spaced and extending ears, through which extend a pair of connecting holes 88. Holes 88 are used to pivotally couple yoke 86, and thus knee 80, to the upper end of front tubing 26. The upper end of tubing 26 has a pair of holes corresponding to holes 88, through which a rivet is placed.

Figure 3:
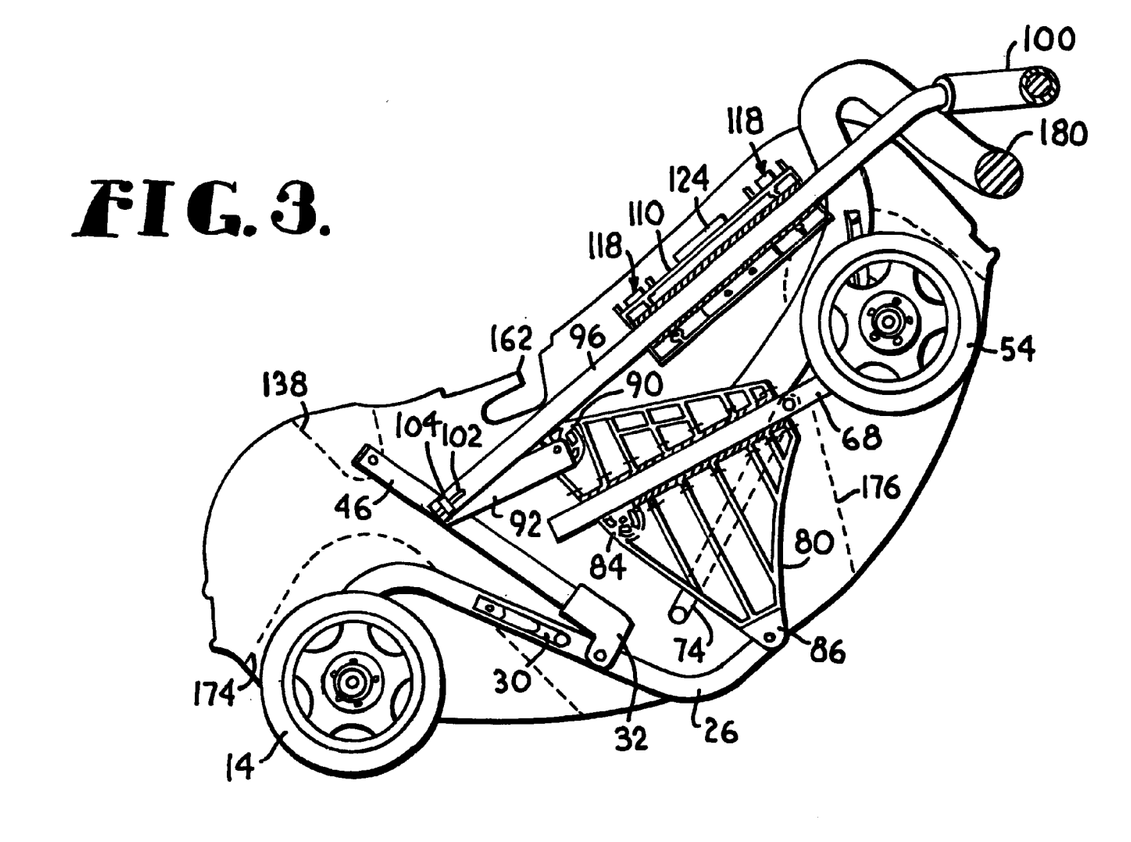
FIG. 3 is a side elevation view of the invention in the stroller mode and similar to FIG. 2, illustrating the linkage system of the invention in a more retracted orientation.
Figure 5:
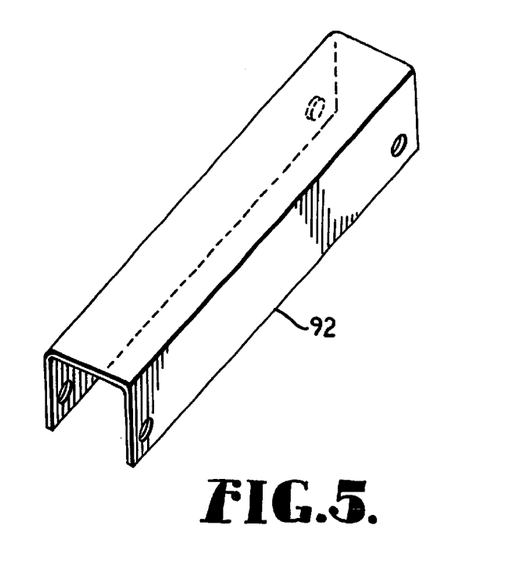
FIG. 5 is a perspective view of the drive link used with the apparatus in FIG. 1.

As best seen in FIG. 7, the upper end of knee 80 distal from yoke 86 includes a link hub 90. Hub 90 is used to pivotally couple a drive link 92 to knee 80. As best seen in FIG. 5, each link 92 is preferably a piece of cold rolled steel that is bent into a u-shape. Each end of link 92 is provided with throughholes to facilitate a pivotal connection. The lower end of link 92 is pivotally coupled to hub 90 of knee 80. The upper end of link 92 is pivotally coupled to a stroller handle 94, as described more fully below. The u-shape of link 92 accommodates handle 94 when device 10 is in the carseat/carrying device mode, as shown in FIG. 3.

Handle 94 has a pair of elongated legs 96 that are connected by a horizontal pushing section 98. Legs 96 and pushing section 98 can be formed from one piece of bent steel tubing. Pushing section 98 is preferably surrounded by a padded grip 100. As best seen in FIGS. 1, 2 and 3, each leg 96 has an elongated slot 102 extending therethrough adjacent its lowermost end. Each link 92 is pivotally coupled to a corresponding leg 96 by a pivot pin 104. Pin 104 is thus placed through the holes in the upper end of link 92 and through slot 102 and is secured in place. Each leg 96 of handle 94 is also provided with a lower lock hole, shown in FIG. 1 as point 106, and an upper lock hole, shown in FIG. 1 as point 108.

Lock hole 106 is used to secure device 10 in the carseat/carrying device mode, and lock hole 108 is used to secure device 10 in the stroller mode, as is more fully described below.

Figures 8, 9:
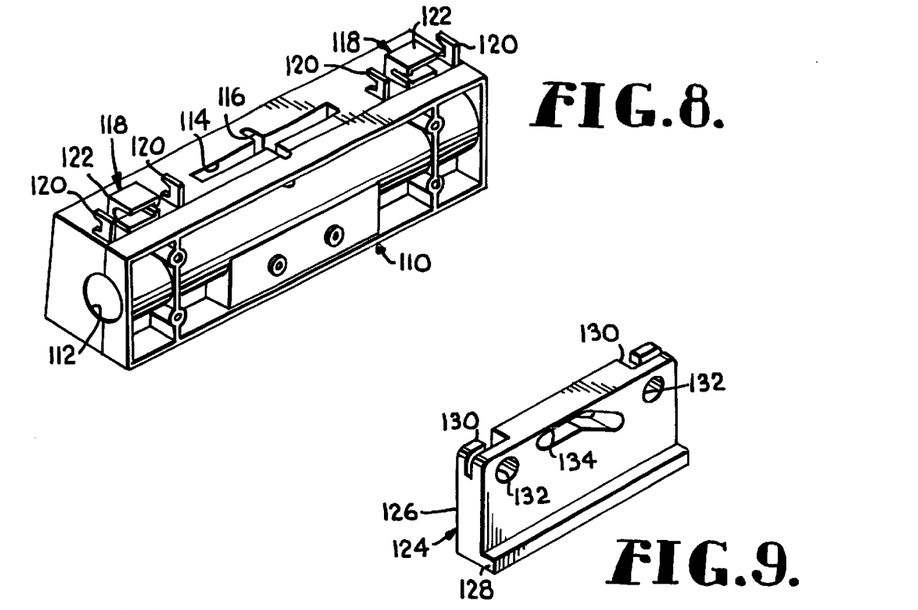
FIG. 8 is a perspective view of a handle guide used with the apparatus in FIG. 1.
FIG. 9 is a perspective view of a lock ramp used with the handle guide of FIG. 8 and the apparatus in FIG. 1.

Rigidly secured to the underside of seat 52 near the upper end thereof is a pair of spaced handle guides 110. As best seen in FIG. 8, each guide 110 is a two piece construction that is preferably bolted or screwed together. The two piece assembly provides a handle hole 112 extending from one end to the other. Hole 112 is sized to be slightly larger than the diameter of legs 96, to allow legs 96 to slide within hole 112. An elongated ramp cavity 114 extends from the top of guides 110 downwardly towards hole 112. Cavity 114 is oriented with its length along the longitudinal axis of hole 112. A locking pin cavity 116 extends perpendicularly to cavity 114. Cavity 116 extends from the top of guides 110 through to hole 112, and is generally located mid-way along cavity 116. The top of each guide 110 is provided with front and rear cable retainers 118. Each retainer 118 includes spaced front and rear guides 120 that have a larger housing 122 located therebetween. As discussed more fully below, retainers 118 are used to retain the operating cable.

Disposed within cavity 114 is a lock ramp 124, as best seen in FIG. 9. Ramp 124 has a generally rectangular section 126 from which extends a retaining lip 128. Lip 128 operates to retain ramp 124 within cavity 114 once it is placed therein. Ramp 124 is thus placed between the two sections of guide 110 prior to securing the two sections together. Lip 128 prevents ramp 124 from moving out of guide 110. Section 126 is sized, however, to allow it to travel back and forth within cavity 114. To allow back and forth movement, ramp 124 is shorter than the length of cavity 114.

Each end of section 126 has a cable retaining slot 130 and a bolt hole 132 that are used to retain the operating cable, as is more fully described below. Rectangular section 126 further has a ramp slot 134 extending therethrough. As best seen in FIG. 9, slot 134 has a generally horizontal section that transitions to a downwardly angled section. Slot 134 acts to cam a locking pin 136 into and out of a locked position within handle 94.

Figure 10:
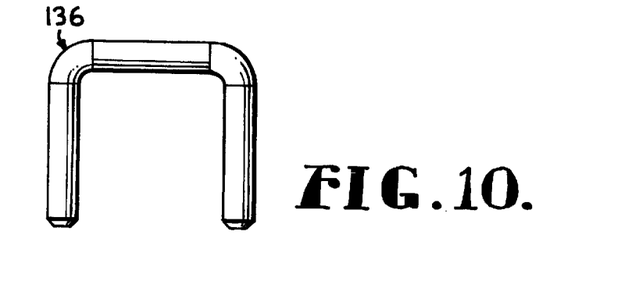
FIG. 10 is a front elevation view of the locking pin used with the lock ramp of FIG. 9 and the apparatus in FIG. 1.

More specifically, a unshaped pin 136, as best seen in FIG. 10, extends through slot 134 in ramp 124 so that the legs of pin 136 extend downwardly. Each of the pair of legs of pin 136 is sized to fit within lock holes 106 and 108. The horizontal section of pin 136 that extends between the legs thereof rides on the lower surface of slot 134. As ramp 124 is moved back and forth within ramp cavity 114, locking pin 136 is moved into or out of locking holes 106 and 108, as pin 136 slides along slot 134.

Figure 15:
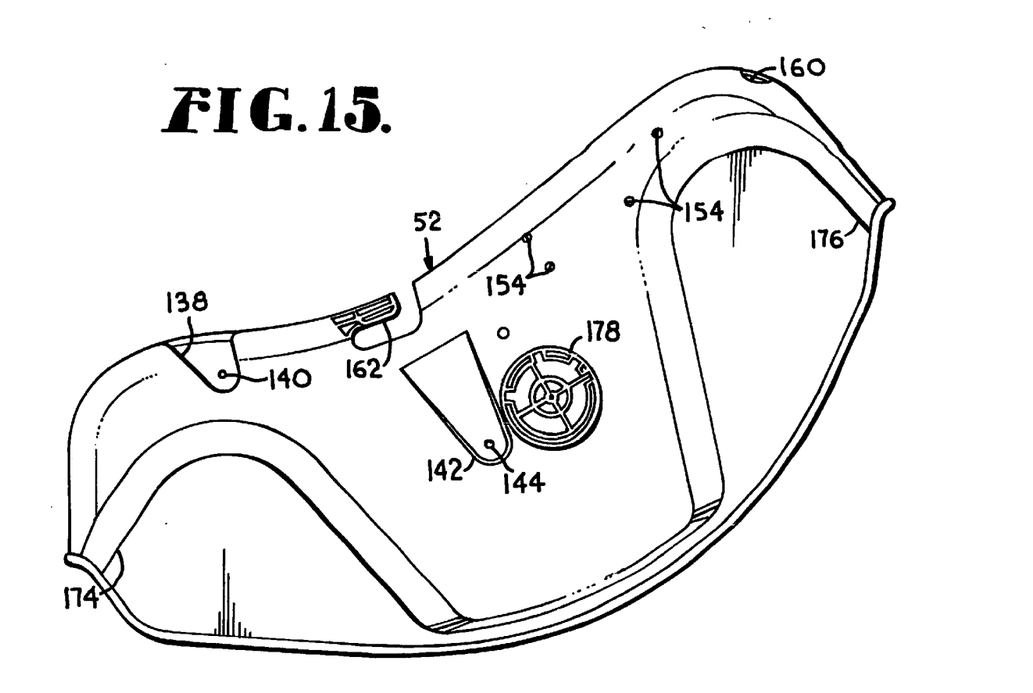
FIG. 15 is a side elevation view of a seat used in the apparatus in FIG. 1.
Figure 16:
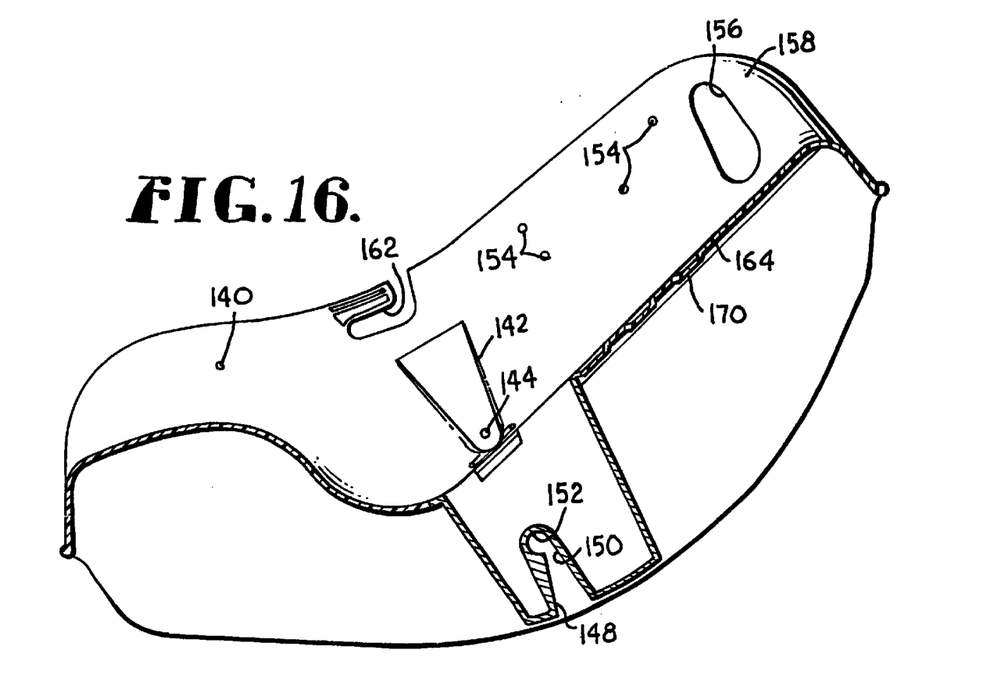
FIG. 16 is a cross-sectional view of the seat of FIG. 15, taken along line 16-16 in FIG. 17.
Figure 17:
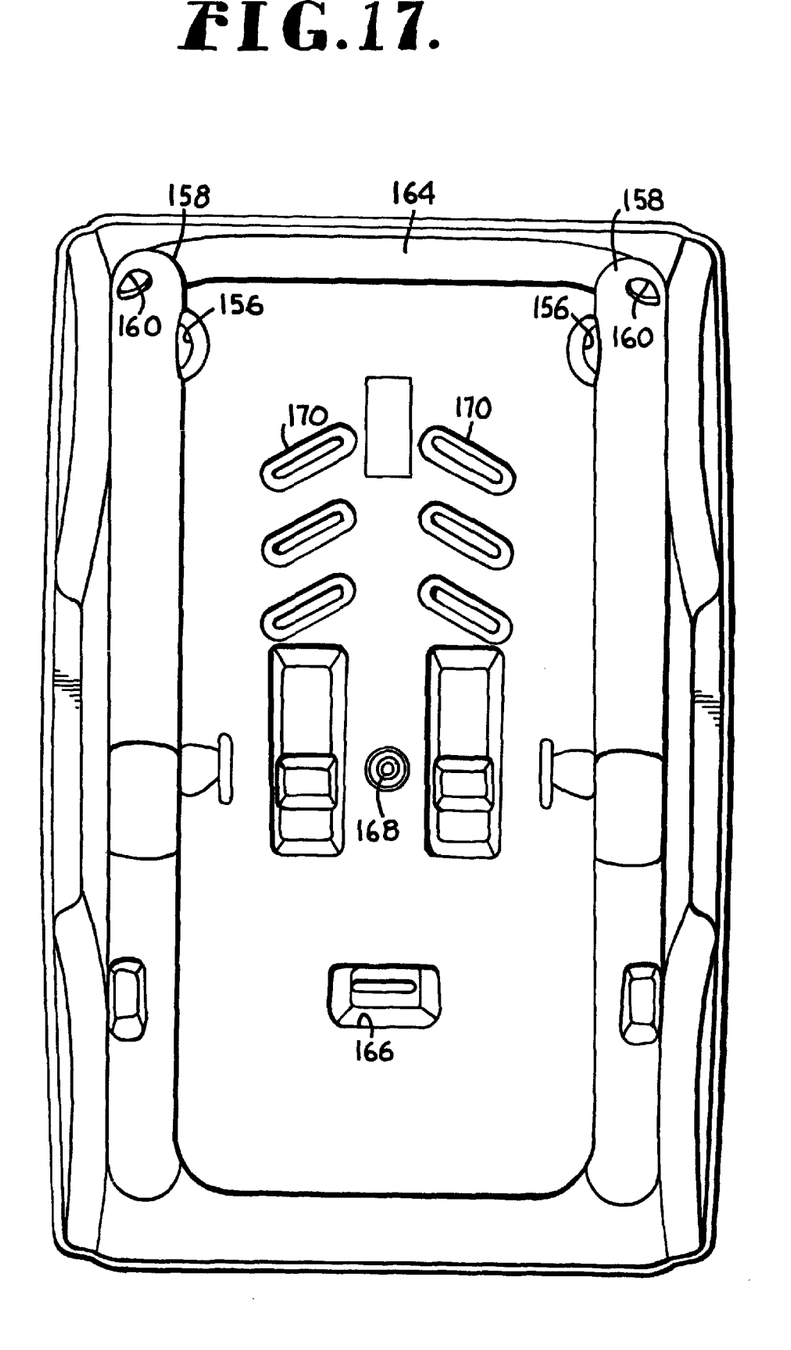
FIG. 17 is a top plan view of the seat of FIG. 15.

As best seen in FIGS. 15 through 17, seat 52 is coupled to several of the elements described above. Seat 52 is includes a front link hub 138 that is molded therein. Hub 138 extends inwardly on the underside of seat 52 and has a coupling hole 140 disposed therethrough. Hole 140 and hub 138 are used to pivotally couple front link 46 to seat 52, as best seen in FIG. 2. Located rearwardly of hub 138 on seat 52 is a knee hub 142. Hub 142, like hub 138, is molded into the underside of seat 52 and includes a coupling hole 144. As best seen in FIG. 1, a spacer 146 is placed between pivot hub 84 of knee 80 and knee hub 142. Thereafter, knee 80, spacer 146 and seat 52 are pivotally coupled together with a connecting mechanism, such as a shoulder bolt or rivet. This assembly allows knee 80 to pivot with respect to seat 52 about the center of pivot hub 84.

As best seen in FIG. 16, seat 52 has molded therein a locking tubing cavity 148 formed into each of a pair of spaced reclining supports 149 Cavity 148 tapers from its lower-most end to a throat section 150 and then opens to a circular chamber 152. Cross section 78 of rear support tubing 74 is snapped into chamber 152 of cavity 148. Throat 150 is of a smaller width than the diameter of tubing 74. As tubing 74 is forced into cavity 148, throat 150 is temporarily widened until tubing 74 is completely within chamber 152. Throat 150 then returns to its original width to hold rear support tubing 74 within chamber 152. Tubing 74 is, however, free to rotate within chamber 152. This coupling of tubing 74 to seat 52 operates to the slide members 68 through hole 82 of knee 80 as knee 80 rotates, thus retracting rear wheels 54.

A series of guide holes 154 extend through seat 52 generally rearwardly of hub 142 Guide holes 154 are used to rigidly mount handle guides 110 to the underside of seat 52 with a suitable attaching mechanism, such as screws, bolts or rivets. Seat 52 further includes an upper relief opening 156 in each of two side walls 158. Opening 156 allows guides 110 to extend partially therethrough, and enable the same guide 110 to be used on either side of the stroller. As best seen in FIG. 17, the upper end of each side wall 158 defines a handle aperture 160 that allows leg 96 of handle 94 to extend therethrough.

Guides 110 are thus secured to the underside of seat 52. Each leg 96 of handle 94 is then placed through a corresponding aperture 160. The lowermost end of each leg 96 is then coupled to drive link 92 by placing a connecting mechanism through the upper holes in link 92 and slot 102 in leg 96. Locking pin 136 is located in either lower lock hole 106 or upper lock hole 108, depending on whether device 10 is in the stroller mode or the carseat mode.

Seat 52 is further equipped with a seat belt retainer 162 in each side wall 158. As is known to those of skill in the art, retainers 162 provide an avenue for the vehicle seat belt and operate to restrain seat 52 within the vehicle. Extending between side walls 158 is a rear wall 164. Wall 164 and walls 158 provide the area within which the infant is held. Wall 164 has molded therein a cavity 166 that houses the female end of a buckle. A pair of restraining straps are riveted to wall 164 through the use of an anchoring aperture 168. Still further, as is known to those of skill in the art, wall 164 has a series of spaced belt openings 170 that are angled as shown. A series of openings is provided to allow for different sizes of infants to be properly held within seat 52. The restraining straps are used to securely hold the infant within the device, as is known to those of skill in the art. As best seen in FIG. 1, a foam block 172 is coupled to wall 164, such as with an adhesive, to provide additional padding for the infant. As is known to those of skill in the art, seat 52 is provided with an outer covering for aesthetic reasons and to provide additional comfort to the infant.

Seat 52 further includes a front wheel well 174 and a rear wheel well 176. Wells 174 and 176 provide a recessed cavity for wheels 14 and 54 when device 10 is in the carseat or carrying mode, as shown in FIG. 3. Seat 52 also includes a pair of circular handle hubs 178. As is known to those of skill in the art, hubs 178 are used to couple a carrying handle 180 to device 10. More specifically, each end of handle 180 has a circular head 182 that is placed over hub 178. Head 182 houses a spring biased push button 184 that locks handle 180 in position relative to seat 52. When button 184 is depressed, handle 180 is free to rotate, and can thus be rotated from a carrying position, where the handle is relatively straight up and down, to a stored position, where the handle is located generally beside side walls 158.

Figure 12:
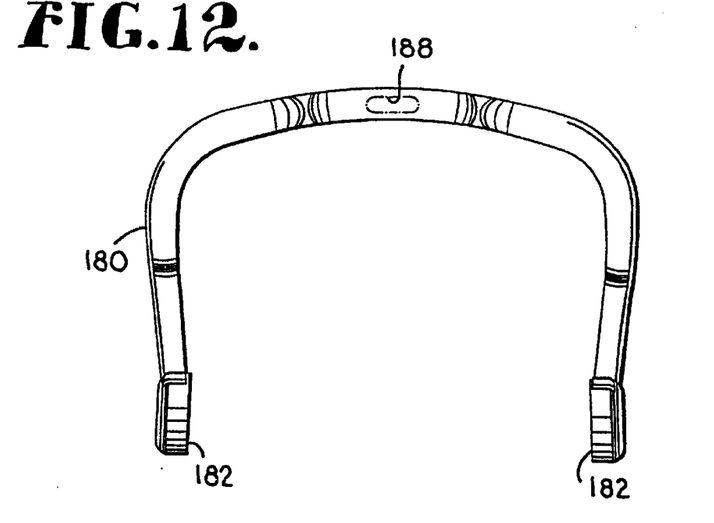
FIG. 12 is a rear elevation view of a carrying handle used in the apparatus in FIG. 1.
Figure 13:
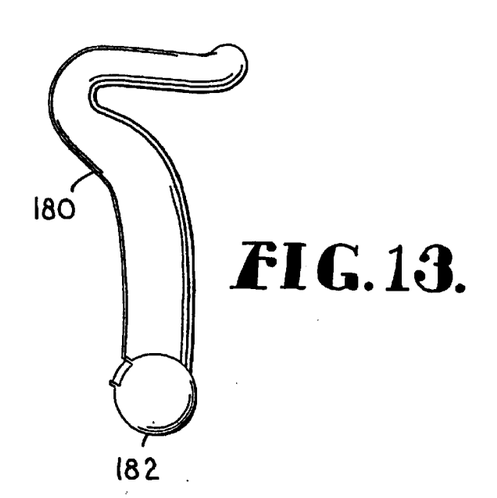
FIG. 13 is a side elevation view of the carrying handle in FIG. 12.
Figure 14:
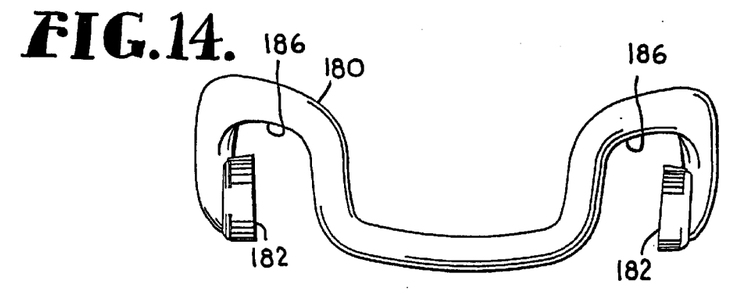
FIG. 14 is a top plan view of the carrying handle in FIG. 12.

Handle 180 is generally hollow to allow the operating cable to travel therethrough, as is more fully described below. Moreover, handle 180 has a novel shape as is best seen in FIGS. 12 through 14. This shape includes to elbow ports 186 that offer a better load carrying capability to the user of device 10. More specifically, the user of device 10 can place his or her arm through handle 180 so that the elbow port 186 is located adjacent the user's elbow. When carrying device 10 using handle 180 the load is located much closer to the user, making it much easier to carry than other devices. Handle 180 is contoured so as to comfortably rest along the arm of the user.

Figure 11:
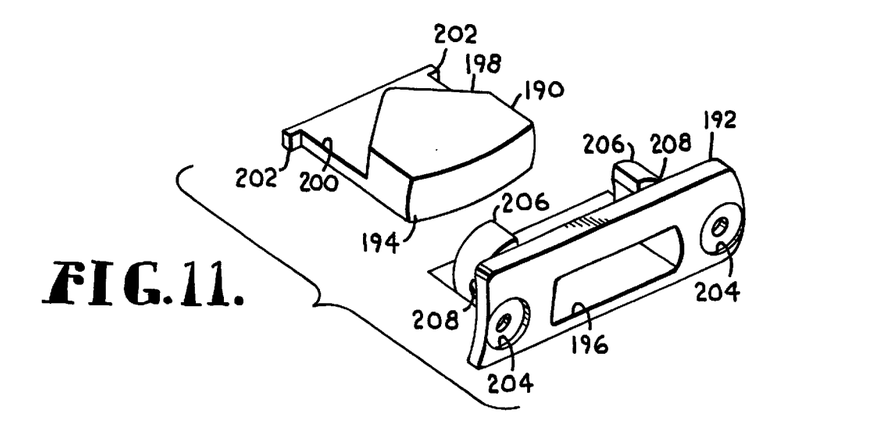
FIG. 11 is an exploded view of a push button and button insert assembly used in the apparatus in FIG. 1.

The central portion of handle 180 has an oval opening 188 therein within which is placed an actuator button 190 and insert 192. As best seen in FIG. 11, actuator 190 has top surface 194 that extends through an opening 196 in insert 192. Located below surface 194 is a V-shaped ledge 198, below which is a retaining surface 200. Surface 200 terminates with a pair of outwardly extending ears 202 that operate to retain button 190 within insert 192. Insert 192 has a pair of countersunk holes 204 that are used to accommodate bolts to attach insert 192 to handle 180. Insert 192 can be secured to handle 180 by bolting, riveting or with the use of other attaching mechanisms. Located below the uppermost surface of insert 192 are a pair of cable retaining fingers 206 that have a slot 208 therein.

An operating cable is coupled to one end of one of the lock ramps 124 through cable slot 130 and bolt hole 132. The opposite end of this lock ramp has a spring coupled thereto. This spring extends from the lock ramp to the adjacent cable retainer 118 of guide 110. The spring biases the lock ramp 124 to a position where locking pin 136 is at its lowermost position. The operating cable runs from lock ramp 124 through the adjacent cable retainer 118 in guide 110 and runs under seat 52. Adjacent handle hub 178, seat 52 is provided with a hole through which the operating cable can extend. The operating cable is routed through this opening and into handle 180 up to actuator button 190 and insert 192. The cable is passed through slot 208 in fingers 206 and over the v-edge 198. Thereafter, the cable is passed through the remaining slot 208 in the opposite finger 206 and is anchored thereto.

Upon pushing downwardly on top surface 194 of button 190, the operating cable is placed in tension and the length thereof from button 190 to locking ramp 124 is made shorter. This operates to move locking ramp 124 within cavity 114 in guide 110. As ramp 124 is moved, locking pin 136 travels up ramp slot 134, to move locking pin 136 out of engagement with either locking hole 106 or 108. The spring on the opposite end of ramp 124 operates to bias the locking ramp and returns the locking ramp to its original position when the pushing force is removed from top surface 194 of button 192. Therefore, the entire linkage of device 10 can be locked and unlocked upon pressing only one button 190. If the above routing of the operating cable is used, only one locking pin 136 is used. It should also be noted that the operating cable can be routed so as to couple both locking ramps together, wherein two locking pins are used. In this embodiment, rather than the return biased spring on the opposite end of the first locking ramp 124, an additional length of operating cable is coupled thereto. This length of operating cable extends from one locking ramp to the other, so that both locking ramps move in unison upon pressing button 190. The return biased spring is then placed on the opposite end of the second locking ramp, to return both locking ramps to their original position when pressure is released from button 190.

Initially, when device 10 is in the carseat mode, handle 180 is rotated so that button 190 is generally above and behind the head of the infant, as shown in FIG. 3. It should be noted that while FIG. 3 shows the front wheels partially extending beyond the frame of seat 52, in operation, front wheels 14 are completely recessed within wheel well 174 when device 10 is in the carseat/carrying device mode. To place device 10 in a carrying mode, handle 180 is rotated to a more upright position by depressing push button 184 and rotating the handle to the desired position.

From either the carseat mode or the carrying mode, the device 10 can easily and conveniently be placed in a stroller mode. To accomplish this, device 10 is held above the ground and button 190 is depressed. As described above, this places the operating cable in tension, which moves ramp 124 within cavity 114. This moves locking pin 136 from its engagement within upper locking hole 108. The weight of the linkage will then cause knee 80 to rotate about pivot hub 84. This rotation causes drive link 92 to rotate and move rearwardly, thus moving handle 94 rearwardly to a more extended position. Legs 96 of handle 94 slide within guides 110 and through aperture 160 in seat 52.

As knee 80 rotates, rear main tubing members 68 rotate and slide downwardly within hole 82. The downward movement of members 68 is caused by the pivotal connection to rear support tubing 74 and, because tubing 74 pivots within chamber 152 on seat 52. In other words, as knee 80 rotates, rear support tubing 74 operates to extend members 68 through hole 82. This operates to extend or deploy rear wheels 54. At the same time, as knee 80 rotates, front main tubing 26 is moved downwardly and outwardly, pivoting about connecting holes 88 in knee 80. Front main tubing is further moved downwardly and outwardly by front link 46, which pivots about front link hub 138. As tubing 26 and links 46 rotate, front saddle joint 32 also rotates about hole 38. When knee 80 is fully rotated, saddle joint 32 will rest against tubing 26, providing additional support for seat 52. In the fully extended position, locking pin 136 will be moved into lower lock hole 106 by the biasing spring on ramp 124, thus locking device 10 in a fully extended stroller mode, shown in FIG. 2. The linkage mechanism described above, through the sliding members 68, provides a stable wheelbase and a comfortable stroller handle height.

When it is desired to move from the stroller mode to the carseat or carrying mode, button 190 is again depressed, and the above series of events is reversed. The operation described above is accomplished by depressing only one button, making the conversion process convenient and easy to accomplish.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The following is claimed:

1. An apparatus convertible between an infant carseat and stroller, comprising:

a seat shell configured to hold an infant;

a coupling knee rotatingly coupled to said seat shell;

at least one front wheel pivotally coupled to said knee so that said front wheel pivots relative to said seat shell when said knee rotates;

at least one rear wheel pivotally coupled to said knee so that said rear wheel pivots relative to said seat shell when said knee rotates;

a stroller handle coupled to said knee, said stroller handle moveable between a first position wherein said stroller handle is extended outwardly from said seat shell and a second position wherein said stroller handle is retracted within said seat shell; and a releasable locking mechanism operably coupled to said stroller handle and said knee, said locking mechanism operable to selectively prevent rotation of said knee; and a drive link having a first end pivotally coupled to said knee and a second end pivotally coupled to said stroller handle, said drive link coupling said stroller handle to said knee to move said stroller handle between said first and second positions as said knee rotates, wherein as said knee rotates, said stroller handle moves between said first and second positions and said front and said rear wheels pivot relative to said seat shell to allow said front and rear wheels to move between a retracted position usable as a carseat and an extended position usable as a stroller.

2. The apparatus of claim 1, further comprising a rear tubing member coupled to said at least one rear wheel and extending upwardly therefrom, and wherein said knee has a hole extending therethrough, said tubing member being slidingly disposed in said hole.

3. The apparatus of claim 2, further comprising a carrying handle rotatingly coupled to said seat shell, said carrying handle moveable between an upright position and a reclined position.

4. The apparatus of claim 3, wherein said carrying handle has disposed therein an actuator button operably connected to said locking mechanism, wherein said locking mechanism is released to allow rotation of said knee when said button is depressed.

5. The apparatus of claim 4, wherein said locking mechanism comprises:

at least one handle guide rigidly secured to said seat shell, said handle guide having a hole therethrough that slidingly accommodates said stroller handle, said handle guide further having an elongated locking ramp cavity and a locking pin cavity;

a locking ramp disposed within said ramp cavity, said ramp being shorter than said ramp cavity to allow said ramp to travel within said ramp cavity, said ramp having an angled slot therein; and a locking pin disposed within said angled slot, wherein said stroller handle has a pair of lock holes therein, said locking pin selectively disposed in one of said lock holes, wherein said actuator button is coupled to said locking ramp so that depressing said actuator button operates to move said locking ramp within said ramp cavity, and wherein as said locking ramp moves, said locking pin is moved upwardly by said angled slot, removing said locking pin from said lock hole, allowing said stroller handle to move within said guide.

* * * * *